(12) United States Patent
Park

(10) Patent No.: US 9,001,748 B2
(45) Date of Patent: Apr. 7, 2015

(54) METHOD FOR SCHEDULING TRAFFIC OF HOME NODE, AND APPLIED TO THE SAME

(75) Inventor: Seong-Soo Park, Seoul (KR)

(73) Assignee: SK Telecom Co., Ltd. (KR)

( * ) Notice: Subject to any disclaimer, the term of this patent is extended or adjusted under 35 U.S.C. 154(b) by 258 days.

(21) Appl. No.: 12/998,329

(22) PCT Filed: Jul. 24, 2009

(86) PCT No.: PCT/KR2009/004145
§ 371 (c)(1),
(2), (4) Date: Apr. 7, 2011

(87) PCT Pub. No.: WO2010/041813
PCT Pub. Date: Apr. 15, 2010

(65) Prior Publication Data
US 2011/0194507 A1     Aug. 11, 2011

(30) Foreign Application Priority Data

Oct. 7, 2008  (KR) .......................... 10-2008-0098339

(51) Int. Cl.
| | |
|---|---|
| *H04W 4/00* | (2009.01) |
| *H04L 12/28* | (2006.01) |
| *H04W 72/12* | (2009.01) |
| *H04L 12/801* | (2013.01) |
| *H04L 12/851* | (2013.01) |
| *H04W 84/04* | (2009.01) |

(52) U.S. Cl.
CPC ............. *H04L 12/2834* (2013.01); *H04L 47/14* (2013.01); *H04L 47/2433* (2013.01); *H04L 47/2441* (2013.01); *H04W 72/1242* (2013.01); *H04W 84/045* (2013.01)

(58) Field of Classification Search
CPC .. H04W 72/10; H04W 72/1242; H04W 88/10
USPC .......................... 370/329; 455/450, 464, 509
See application file for complete search history.

(56) References Cited

U.S. PATENT DOCUMENTS

| | | | |
|---|---|---|---|
| 2004/0198223 A1* | 10/2004 | Loh et al. ...................... 455/41.1 |
| 2006/0161663 A1* | 7/2006 | Palm ............................. 709/227 |
| 2007/0150616 A1 | 6/2007 | Baek | |
| 2008/0076412 A1 | 3/2008 | Khetawat | |
| 2008/0299987 A1* | 12/2008 | Iyer et al. ...................... 455/454 |
| 2010/0016022 A1* | 1/2010 | Liu et al. ....................... 455/561 |
| 2010/0103831 A1* | 4/2010 | Caldwell et al. .............. 370/252 |

FOREIGN PATENT DOCUMENTS

KR    1020030082671    10/2003

* cited by examiner

*Primary Examiner* — Michael Thier
*Assistant Examiner* — Brian Cox
(74) *Attorney, Agent, or Firm* — Baker Hostetler LLP

(57) ABSTRACT

Disclosed are a method of scheduling traffic at a home node and an apparatus employing the same. The home node integrated with the femtocell function to interwork with a mobile phone, the home gateway function to control electronic devices, and a set-top box function schedules traffic data transmission according to the characteristics of available services, thereby ensuring the optimum QoS (Quality of Service) according to the service characteristics. Accordingly, the QoS of mobile communication services requiring real time is ensured independently from that of Internet application services. Priorities are assigned to Internet application services according to the characteristics thereof, so that data requirements are satisfied according to services.

13 Claims, 6 Drawing Sheets

METHOD FOR SCHEDULING TRAFFIC OF HOME NODE, AND APPLIED TO THE SAME

TECHNICAL FIELD

The present invention relates to a method for scheduling traffic at a home node and an apparatus employing the same. More particularly, the present invention relates to a method for scheduling traffic at a home node and an apparatus employing the same, in which the home node integrated with the femtocell function to interwork with a mobile phone, the home gateway function to control electronic devices, and a set-top box function schedules traffic data transmission according to characteristics of available services, thereby ensuring the optimum QoS (Quality of Service) according to the service characteristics.

BACKGROUND ART

Recently, a femtocell has been suggested as a personal access point to provide services to one to four subscribers inside a customer premise. The femtocell is installed and operated at home or a small office.

Independently from a home network system, the femtocell controls the shadow area and provides high-speed data in a mobile communication service. In addition, the femtocell is a small-size access point to provide a mobile communication service within the radius of about 100 m, which is called a home node-B.

As described above, a home node device includes both of the home network system and the femtocell in one body to provide a service. In detail, the home node device is integrated with the femtocell function to interwork with a mobile phone a home gateway function to control electronic devices, and a set-top box function.

In other words, the home node includes a mobile phone interface, a high-speed Internet interface, a WPAN interface for the control of household appliances, a WiFi interface for a wireless data service, and audio and video interfaces for the connection of a TV.

However, the integration of various interfaces degrades QoS due to traffic overload because the interfaces not only have different interface characteristics, but require different service characteristics.

DISCLOSURE

Technical Problem

Accordingly, the present invention has been made to solve the above-mentioned problems occurring in the prior art, and an object of the present invention is to provide a method of scheduling traffic and an apparatus employing the same, in which a home node integrated with the femtocell function to interwork with a mobile phone, the home gateway function to control electronic devices, and a set-top box function, schedules traffic data transmission according to characteristics of available services, thereby ensuring the optimum QoS (Quality of Service) according to the service characteristics.

Another object of the present invention is provide a method of scheduling traffic at a home node and an apparatus employing the same, in which priorities are set with respect to available services at the home node, so that traffic transmission can be scheduled.

Technical Solution

In order to accomplish the objects of the present invention, according to one aspect, there is provided a home node apparatus, the home node apparatus includes a home gateway module for providing a home network service to a service area based on a home network, a femtocell module connected to a mobile communication system through an Internet circuit to provide a mobile communication service to the service area, and a scheduling module for scheduling traffic, which occurs by performing at least one of the home network service and the mobile communication service, according to preset transmission priorities to transmit/receive traffic data.

Preferably, the scheduling module performs a scheduling process to set the transmission priorities when at least two types of traffic data are received.

According to another aspect, there is provided a scheduling apparatus of a home node for traffic transmission. The scheduling apparatus includes a buffer module for storing traffic data received by performing a home network service or a mobile communication service, a traffic classifying module for classifying the traffic data according to traffic data reception paths when at least two types of traffic data are received, a scheduling module for performing a scheduling process with respect to the at least two types of traffic data according to preset transmission priorities, and a transmitter for transmitting the at least two types of traffic data corresponding to the transmission priority.

Preferably, when one of the at least two types of traffic data forms the traffic data reception paths through the mobile communication interface for the mobile communication service, the scheduling module processes traffic data forming the traffic data received paths through the mobile communication interface by a first transmission priority.

Preferably, when at least two types of traffic data are processed by the first transmission priority, the scheduling module schedules the at least two types of traffic data by a) $(1-1)^{th}$ priority to a $(1-N)^{th}$ priority based on times to receive the at least two types of traffic data Preferably, when one of at least two types of traffic data forms the traffic data reception paths through a home network interface for the home network service, the scheduling module processes traffic data forming the traffic data reception paths through a home network interface by a second transmission priority.

Preferably, when at least two types of traffic data are processed by the second transmission priority, the scheduling module determines the service attributes corresponding to the at least two types of traffic data and schedules the at least two types of traffic data by a $(2-1)^{th}$ priority to a $(2-N)^{th}$ priority based on transmission priorities for the service attributes of the at least two types of traffic data.

Preferably, the transmission priorities for the service attributes are set in order of a real-time transmission attribute, a control attribute of a device over the home network, and a non-real-time transmission attribute.

Preferably, the scheduling module determines the service attributes based on a preset protocol stack.

According to yet another aspect, there is provided a scheduling apparatus of a home node for traffic reception. The scheduling apparatus includes a receiver for receiving traffic data through an Internet circuit, a traffic determining module for determining a target interface used to send the traffic data to a service area based on a home network, a scheduling module for scheduling the traffic data according to a preset transmission priority for the target interface, and a sending module for sending the traffic data to the service area according to the transmission priority.

Preferably, the target interface includes one of interfaces used to perform a mobile communication service and a home network service.

Preferably, the scheduling module schedules the traffic data by a first transmission priority when the traffic data are targeted to the interface for the mobile communication service.

Preferably, the scheduling module schedules the traffic data by a second transmission priority when the traffic data are targeted to the interface for the home network service.

Preferably, the interface for the home network service includes one of interfaces having a real-time transmission attribute, a control attribute of device over a home network, and a non-real-time transmission attribute.

Preferably, the scheduling module schedules the traffic data by a $(2-1)^{th}$ priority to a $(2-N)^{th}$ priority based on preset transmission priorities for the interfaces according to the service attributes.

Preferably, the transmission priorities for the interfaces according to the service attributes are set in order of a real-time transmission attribute, a control attribute of a device over the home network, and a non-real-time transmission attribute.

According to yet another aspect, there is provided a scheduling method of a home node for traffic transmission. The scheduling method includes storing traffic data received by performing a home network service or a mobile communication service, classifying the traffic data according to traffic data reception paths when at least two types of traffic data are received, performing a scheduling process with respect to the at least two types of traffic data according to preset transmission priorities, and sequentially transmitting the at least two types of traffic data corresponding to the transmission priority.

Preferably, in the scheduling, when one of the at least two types of traffic data forms the traffic data reception paths through a mobile communication interface for the mobile communication service, traffic data forming the traffic data received paths through the mobile communication interface are processed by a first transmission priority.

Preferably, in the scheduling, when one of the at least two types of traffic data forms the traffic data reception paths through a home network interface for the home network service, traffic data forming the traffic data reception paths through a home network interface are processed by a second transmission priority.

Preferably, in the scheduling, when at least two types of traffic data are processed by the second transmission priority, the service attributes corresponding to the at least two types of traffic data have been determined and scheduled by a $(2-1)^{th}$ priority to a $(2-N)^{th}$ priority based on transmission priorities for the service attributes of the at least two types of traffic data.

According to yet another aspect, there is provided a scheduling method of a home node for traffic reception. The scheduling method includes receiving traffic data through an Internet circuit, determining a target interface used to send the traffic data to a service area based on a home network, scheduling the traffic data according to a present transmission priority for the target interface, and sending the traffic data to the service area according to the transmission priority.

Preferably, the target interface includes one of interfaces used to perform a mobile communication service and a home network service.

Preferably, in the scheduling, the traffic data are scheduled by a first transmission priority when the traffic data are targeted to the interface for the mobile communication service.

Preferably, in the scheduling, the traffic data are scheduled by a second transmission priority when the traffic data are targeted to the interface for the home network service.

Advantageous Effect

As described above, according to the present invention, a home node integrated with the femtocell function to interwork with a mobile phone, the home gateway function of electronic devices, and a set-top box function schedules traffic data transmission according to characteristics of the available services, thereby ensuring the optimum QoS (Quality of Service) according to the service characteristics. Accordingly, the QoS of mobile communication services requiring real time can be ensured independently from that of Internet application services. Priorities are assigned to Internet application services according to the characteristics thereof, so that data requirements are satisfied according to services.

MODE OF INVENTION

Hereinafter, an exemplary embodiment of the present invention will be described with reference to accompanying drawings.

Figure 1:
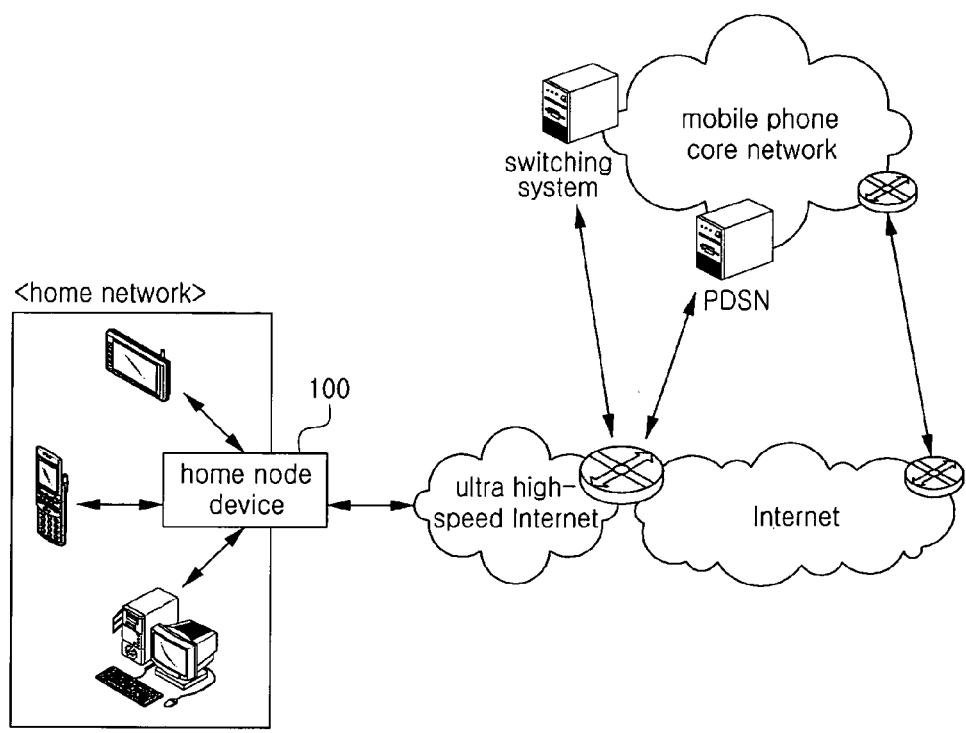
FIG. 1 is a view showing network architecture related to a home node device to schedule traffic according to one embodiment of the present invention.

FIG. 1 is a view showing the structure of a network related to a home node device 100 to schedule traffic according to one embodiment of the present invention. As shown in FIG. 1, the home node device 100 supports a home network-based service by integrating a femtocell and a home gateway.

Figure 2:
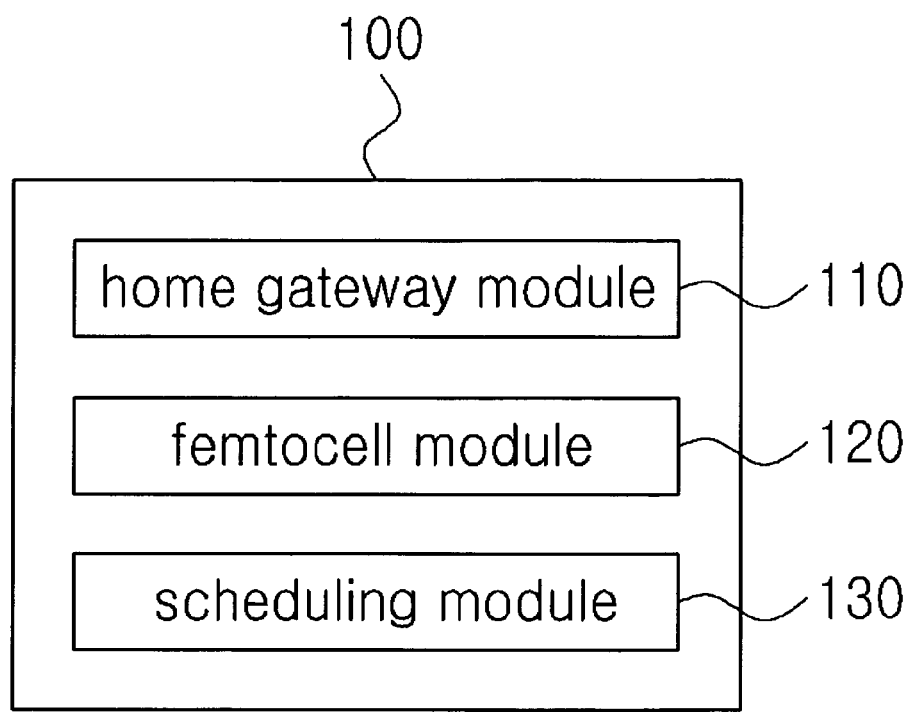
FIG. 2 is a block diagram showing the structure of the home node device of FIG. 1.

FIG. 2 is a block diagram showing the structure of the home node device 100 shown in FIG. 1. As shown in FIG. 2, the home node device 100 includes a home gateway module 110 for providing home network services (e.g. a real-time transmission service such as a VoIP service or a streaming service, a service of controlling electronic equipment over a home network, and a non-real-time transmission service such as a web surfing service or a mail service) to a service area based on the home network, a femtocell module 120 connected to a mobile communication system through an Internet circuit to provide mobile communication services (video communication or voice communication) to a mobile terminal located at the service area of the home network, and a scheduling module 130 for scheduling traffic, which occurs by performing at least one of the home network service and the mobile communication service, according to preset transmission priority to transmit/receive traffic data.

In this case, the home node device 100 includes a mobile phone wireless interface and functions of a base station controller through the femtocell module 12, and includes a communication interface for a home network service such as a wireless LAN service, an Ethernet service, or a Zig-Bee service and a protocol stack for the cooperation with a home server.

Figure 3:
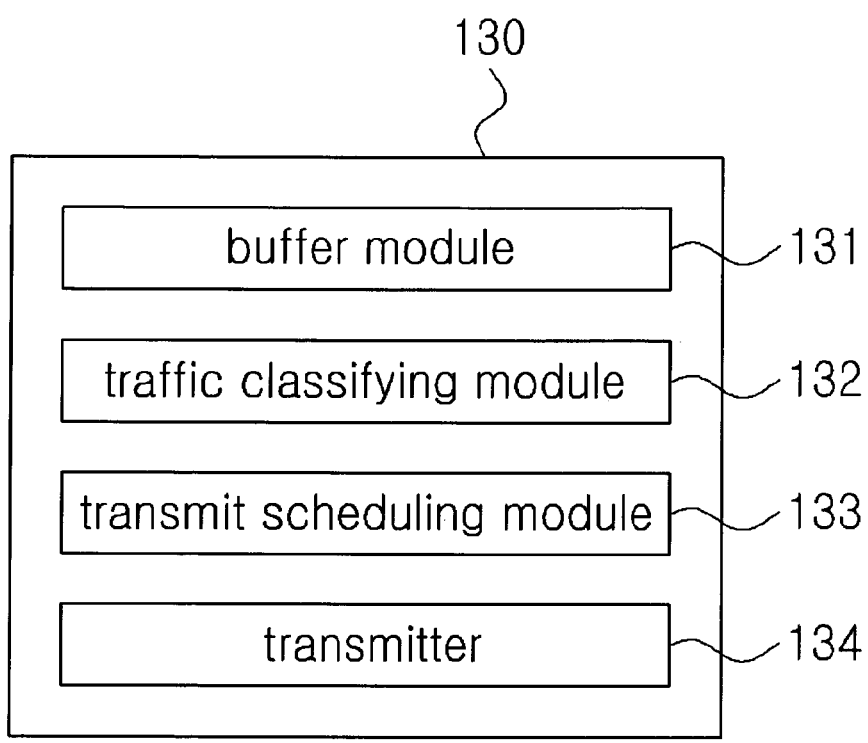
FIG. 3 is a block diagram showing a scheduling module of the home node device of FIG. 2 to transmit traffic data.

FIG. 3 is a block diagram showing the scheduling module 130 of the home node device 100 of FIG. 2 to transmit traffic data. As shown in FIG. 3, the scheduling module 130 of the home node device 100 for transmitting traffic data includes a buffer module 131 for storing traffic data delivered under the home network service or the mobile communication service, a traffic classifying module 132 for classifying traffic data according to traffic data reception paths when a plurality of interfaces are activated so that at least two types of traffic data are received, a transmit scheduling module 133 for performing scheduling with respect to each of at least two types of traffic data according to preset transmission priorities for the classified traffic data, and a transmitter 134 for transmitting at least two types of traffic data corresponding to the transmission priorities of the transmit scheduling module 130.

If one of the traffic data is received through the mobile communication interface for the mobile communication service, the scheduling module 130 processes the traffic data received through the mobile communication interface by a first priority which represents the highest priority.

In addition, if one of the traffic data is received through a home network interface for the home network service, the scheduling module 130 processes traffic data received through the home network interface by a second priority which represents the next priority.

In more detail, in the case of the home network service, traffic data which are scheduled by the second priority and processed, after service attributes of the traffic data have been determined, the determination result is matched with transmission priorities preset for the service attributes, so that the traffic data are scheduled again.

The transmission priorities based on the service attributes refers to priorities for services based on a real-time transmission attribute, an attribute of controlling devices over a home network, or a non-real-time transmission attribute, which are derived from the home network service, and are set the order of preset priorities.

Figure 4:
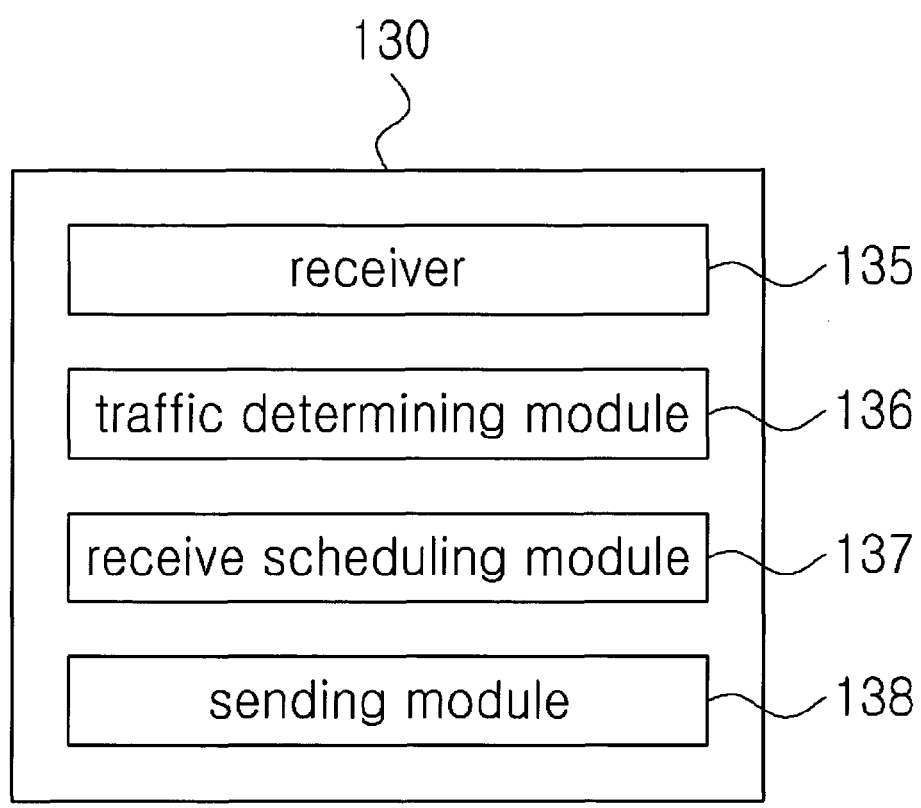
FIG. 4 is a block diagram showing the scheduling module of the home node of FIG. 2 to receive traffic data.

FIG. 4 is a block diagram showing the scheduling module 130 of the home node device 100 shown in FIG. 2 used to receive traffic. As shown in FIG. 4, the scheduling module 130 of the home node device 100 used to receive traffic includes a receiver 135 for receiving traffic data through an Internet circuit, a traffic determining module 136 for analyzing header information of the traffic data to determine the destination of the traffic data and setting target interfaces required to reach the destination based on the header information, a receive scheduling module 137 for scheduling traffic data according to the transmission priorities preset with respect to the target interfaces, and a sending module 138 for sending the traffic data to the service area according to the transmission priorities of the receive scheduling module 137.

In this case, if the scheduling module 130 determines the traffic data received through the Internet circuit so that the traffic data are targeted at the mobile communication interface provided to execute the mobile communication service, the scheduling module 130 processes the traffic data through the mobile communication interface by the first priority that is the highest transmission priority.

Meanwhile, if the scheduling module 130 determines the traffic data received through the Internet circuit so that the traffic data are targeted at the home network interface provided to execute the home network service, the scheduling module 130 processes the traffic data through the home network interface by the second priority that is the next transmission priority.

Preferably, in the case of the home network service, the scheduling process is performed by more concretely setting the transmission priorities for services based on the real-time transmission attribute, the attribute of controlling the devices over at the home network, and the non-real-time transmission attribute.

Figure 5:
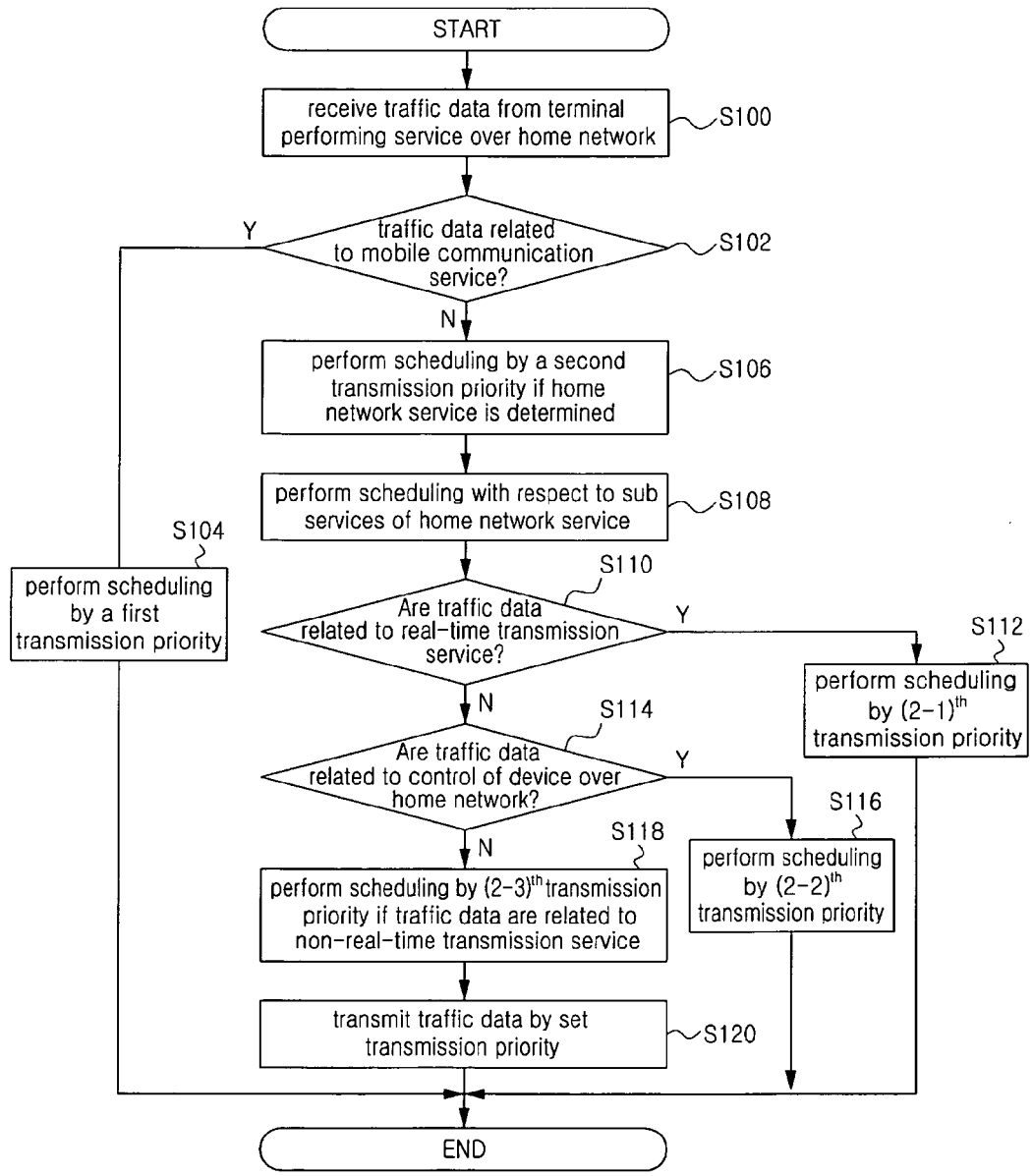
FIG. 5 is a flowchart showing a method of transmitting traffic data by the home node device of FIG. 1.

FIG. 5 is a flowchart showing the procedure of transmitting traffic data by the home node device 100 of FIG. 1. As shown in FIG. 5, in order to schedule traffic data to be transmitted, the home node device 100 receives traffic data generated through the execution of a predetermined service by a terminal located in the service area over the home network (step S100).

Thereafter, the home node device 100 performs a scheduling process according to the transmission priorities and determines if the traffic data are related to the mobile communication service (step S102).

If the traffic data are related to the mobile communication service in step S102, the traffic data are scheduled by the first priority that is the highest priority, so that the traffic data are processed through the mobile communication interface (step S104).

If the traffic data are not related to the mobile communication service in step S102, the home node device 100 determines the traffic data as the traffic data related to the home network service to schedule the traffic data by the second priority, so that the traffic data are processed through the home network interface (step S106).

In this case, the scheduling process is more concretely performed with respect to the home network service (step S108). The home network service includes real-time services such as a VoIP service or a streaming service, a service of controlling devices over a home network, and non-real time services such as a web surfing service or a mail service. Accordingly, traffic data must be processed according to the service characteristics.

First, the home node device 100 determines if the traffic data have been received in real time (step S110). If the traffic data are related to the real-time transmission service as the determination result of the step S110, the home node device 100 sets the priority of the traffic data to a 2-1 priority which is the highest scheduling priority in the home network service (step S112).

If the traffic data are not related to the real-time transmission service in step S110, the home node device 100 determines if the traffic data are related to the service of controlling the device over the home network which has the next scheduling priority in the home network service (step S114).

If the traffic data corresponds to the service of controlling the device over the home network step S114, the transmission priority of the traffic data is set to a 2-2 priority which corresponds to the next priority to the real-time transmission service (step S116).

Thereafter, if the traffic data are not related to the service of controlling the device over the home network in step S114, the home node device 100 determines the traffic data as traffic data for the non-real-time transmission service having the next priority, so that the transmission priority of the traffic data is set to a 2-3 priority which is the next priority to the service of controlling device on the home network (step S118).

Thereafter, the home node device 100 transmits the traffic data through the Internet circuit according to the transmission priorities (step S120).

Figure 6:
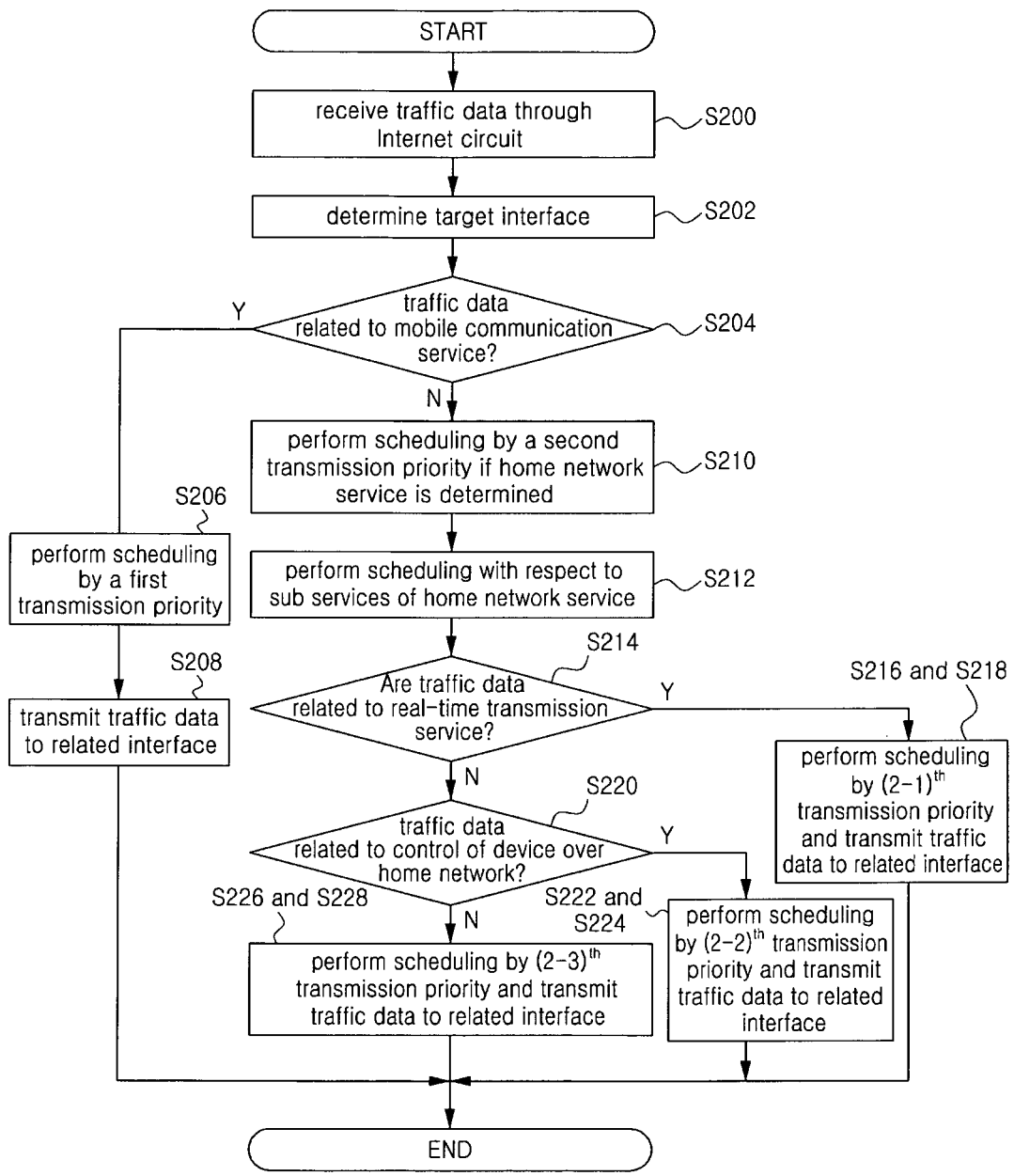
FIG. 6 is a flowchart showing a method of receiving traffic data by the home node device of FIG. 1.

FIG. 6 is a flowchart showing the procedure of receiving traffic data by the home node device 100 of FIG. 1. As shown in FIG. 6, in order to schedule the reception of traffic data, traffic data are received through the Internet circuit (step S200).

Then, the home node device 100 analyzes header information of the traffic data to determine a target interface which is the destination of the traffic data. Then, the home node device 100 performs a scheduling process according to transmission priorities, and determines if the traffic data are related to the mobile communication service (steps S202 and S204).

If the traffic data are related to the mobile communication service in step S204, the traffic data are scheduled and processed by the first priority that is the highest transmission priority, and sent to the mobile communication interface (steps S206 and S208).

If the traffic data are not related to the mobile communication service in step S204, the home node device 100 determines the traffic data as the traffic data related to the home network service so that the traffic data are scheduled and processed by a second transmission priority (step S210).

In this case, the home network service is more concretely scheduled in step S212. The home network service includes real-time services such as a VoIP service or a streaming service, a service of controlling devices over a home network, and non-real time services such as a web surfing service or a mail service. Accordingly, traffic data must be processed according to the service characteristics.

First, the home node device 100 determines if the traffic data are related to the real-time transmission service (step S214). If the traffic data are related to the real-time transmission service as the determination result, the home node device 100 sets the priority of the traffic data to the highest scheduling priority in home network service, and transfers the traffic data to the related interface (steps S216 and 218).

If the traffic data are not related to the real-time transmission service in step S214, the home node device 100 determines if the traffic data are related to a service of controlling a device over the home network, which has the second scheduling priority in the home network service (step S114).

If the traffic data corresponds to the service of controlling the device over the home network step S214, the priority of the traffic data is set to the next priority to the real-time transmission service and the traffic data are transferred to the related interface (steps S222 and S224).

Thereafter, if the traffic data are not related to the service of controlling the device over the home network in step S214, the home node device 100 determines the traffic data as traffic data for the non-real-time transmission service having the next priority, so that the priority of the traffic data is set to the next priority to the service of controlling device on the home network (steps S226 and S228).

Although exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, according to the present invention, a home node integrated with the femtocell function to interwork with a mobile phone, the home gateway function to control electronic devices, and a set-top box function schedules traffic data transmission according to the characteristics of available services, thereby ensuring the optimum QoS (Quality of Service) according to the service characteristics. Accordingly, the present invention can be made sufficiently available on the related market and in the business field, and can be utilized in practice, and therefore the present invention has industrial applicability.

The invention claimed is:

1. A home node apparatus comprising:
    a home gateway device for providing a home network service to a service area based on a home network inclusive of, at least, real time transmission service, a service of controlling electronic equipment and non-real time transmission service;
    a femtocell module connected to a mobile phone core network through an Internet circuit to provide a limited mobile communication service to a mobile terminal located at the service area of the home gateway device through the mobile phone core network within a controlled short radius surrounding the home gateway device; and
    scheduling apparatus for performing at least said real time transmission service through the home network service and said mobile communication service through the femtocell module according to preset transmission priorities for both the home network service and the mobile communication service, with said scheduling apparatus comprising:
    a buffer for storing traffic data received by performing a home network service representing a first type of traffic data and or a mobile communication service representing a second type of traffic data;
    a traffic classifier for distinguishing between said first type of traffic data and said second type of traffic data and for classifying each of the two types of traffic data;
    scheduling software for performing a scheduling process to assign transmission priorities determined by each of the two types of traffic data wherein the second type of traffic data is assigned a transmission priority which is higher than the transmission priority assigned to the first type of traffic data, with the traffic data of the second type processed based on service attribute priorities with real-time transmission accorded the highest transmission priority; and
    a transmitter for transmitting the traffic data corresponding to the assigned transmission priority.

2. The scheduling apparatus of claim 1, wherein, when the traffic data related to the home network service includes a real time service attribute such as streaming services and a non-real time service attribute and with the transmission priority set based on the different service attributes of the home network service such that the scheduling of priority for such of traffic data corresponds to a $(2-1)^{th}$ priority to a $(2-N)^{th}$ priority based on preset transmission priorities according to the service attributes.

3. The scheduling apparatus of claim 2, wherein the transmission priorities for the service attributes are set in order of a real-time transmission attribute, a control attribute of a device over the home network, and a non-real-time transmission attribute.

4. The scheduling apparatus of claim 2, wherein the scheduling software determines the service attributes based on a preset protocol stack.

5. A scheduling apparatus for scheduling traffic reception through a home node which includes:
    a home gateway device for providing a home network service to a service area based on a home network inclusive of, at least, a real time transmission service, a service of controlling electronic equipment and a non-real time transmission service; and
    a femtocell module connected to a mobile phone core network through an Internet circuit to provide a limited mobile communication service to a mobile terminal located at the service area of the home gateway device within a controlled short radius surrounding the home gateway device, with the scheduling apparatus comprising:

a buffer for storing traffic data received by performing said home network service representing a first type of traffic data and said mobile communication service representing a second type of traffic data;

a receiver for receiving traffic data through an Internet circuit;

a traffic determinator for distinguishing between the two types of traffic data when both of the two types of traffic data are being directed to a target interface simultaneously;

scheduling software for scheduling the traffic data received according to preset transmission priority for the target interface wherein the scheduling software schedules the traffic data by a first transmission priority when the traffic data is targeted to the interface for the mobile communication service and schedules the traffic data by a second transmission priority when the traffic data is targeted to the interface for the home network service wherein the second type of traffic data is assigned a transmission priority which is higher than the transmission priority assigned to the first type of traffic data, wherein the traffic data of the second type of traffic data is processed based on service attribute priorities with real-time transmission accorded the highest transmission priority; and a transmitter for transmitting the traffic data to the service area according to the scheduled transmission priority.

6. The scheduling apparatus of claim 5, wherein the target interface includes one of interfaces used to perform a mobile communication service and a home network service.

7. The scheduling apparatus of claim 6, wherein the interface for the home network service includes one of interfaces having a real-time transmission attribute, a control attribute of device over a home network, and a non-real-time transmission attribute.

8. The scheduling apparatus of claim 7, wherein the scheduling module schedules the traffic data by a $(2-1)^{th}$ priority to a $(2-N)^{th}$ priority based on preset transmission priorities for the interfaces according to the service attributes.

9. The scheduling apparatus of claim 8, wherein the transmission priorities for the interfaces according to the service attributes are set in order of a real-time transmission attribute, a control attribute of a device over the home network, and a non-real-time transmission attribute.

10. A scheduling method for scheduling traffic data reception through a home node apparatus comprising, a home gateway device for providing a home network service to a service area based on a home network inclusive of, at least, a real time transmission service, a service of controlling electronic equipment and a non-real time transmission service and a femtocell module connected to a mobile phone core network through an Internet circuit to provide a limited mobile communication service to a mobile terminal, located at the service area of the home gateway device within a controlled short radius surrounding the home gateway device, through the mobile phone core network, with the scheduling method comprising:

storing traffic data received by performing said home network service representing a first type of traffic data and a said mobile communication service representing a second type of traffic data;

classifying the traffic data according to traffic data reception paths when the two types of traffic data are received;

distinguishing between the two types of traffic data when both of the two types of traffic data are being directed to a target interface simultaneously;

using scheduling software for scheduling the traffic data based upon the two types of traffic data according to preset transmission priorities wherein the scheduling software schedules the traffic data by a first transmission priority for the first type of traffic data and schedules the traffic data by a second transmission priority for the second type of traffic data wherein the second type of traffic data is assigned a transmission priority which is higher than the transmission priority assigned to the first type of traffic data, with the traffic data of the second type processed based on service attribute priorities with real-time transmission accorded the highest transmission priority; and sequentially transmitting the two types of traffic data to the service area according to the scheduled transmission priority.

11. The scheduling method of claim 10, wherein when traffic data is being processed by the second transmission priority, the scheduling software determines service attributes corresponding to the two types of traffic data by a $(2-1)^{th}$ priority to a $(2-N)^{th}$ priority based on preset transmission priorities for the service attributes.

12. A scheduling method for scheduling traffic data reception through a home node device including a home gateway device for providing a home network service to a service area based on a home network and a femtocell module connected to a mobile phone core network through an Internet circuit to provide a mobile communication service to the service area of the home gateway device through the mobile phone core network, with the scheduling method comprising:

receiving traffic data through the Internet circuit from a home network service representing a first type of traffic data and from a mobile communication service representing a second type of traffic data;

classifying the traffic data according to traffic data reception paths when the two types of traffic data are received;

determining a target interface for the traffic data with the target interface representing a service area to which the traffic data is being sent based on the home network;

scheduling the traffic data according to a preset transmission priority for the target interface wherein the scheduling operation schedules the traffic data by a first transmission priority when the traffic data is targeted to the interface for the mobile communication service and schedules the traffic data by a second transmission priority when the traffic data is targeted to the interface for the home network service with the second type of traffic data being assigned a transmission priority which is higher than the transmission priority assigned to the first type of traffic data, with the traffic data of the second type processed based on service attribute priorities with real-time transmission accorded the highest transmission priority; and sending the traffic data to the service area according to the transmission priority.

13. The scheduling method of claim 12, wherein the target interface includes one of interfaces used to perform a mobile communication service and a home network service.

* * * * *